No. 682,824. Patented Sept. 17, 1901.
P. J. TUNNY.
LAWN MOWER.
(Application filed Jan. 23, 1901.)
(No Model.)

Witnesses.
H. W. Sturgeon
F. J. Baslett

Inventor.
Patrick J. Tunny.
By H. W. Sturgeon
att'y

UNITED STATES PATENT OFFICE.

PATRICK J. TUNNY, OF NORTHEAST, PENNSYLVANIA.

LAWN-MOWER.

SPECIFICATION forming part of Letters Patent No. 682,824, dated September 17, 1901.

Application filed January 23, 1901. Serial No. 44,369. (No model.)

*To all whom it may concern:*

Be it known that I, PATRICK J. TUNNY, a citizen of the United States, residing at Northeast, in the county of Erie and State of Pennsylvania, have invented certain new and useful Improvements in Lawn-Mowers; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in lawn-mowers whereby low-lying weeds and vines may be removed and cut thereby.

In lawn-mowers as ordinarily constructed it is impossible to cut low-lying weeds, especially those of the vine species, as the stationary cutter-bar passes over them. In order to overcome this difficulty, I construct the stationary cutter-blade of the lawn-mower with teeth, the edges of which are parallel and sharp, which project forward and also incline downward from the front edge of the cutter-blade, the spaces between the teeth forming the cutting edge of the blade against which the rotary cutter-cylinder operates. The points of these teeth entering the grass ahead of and at some distance below the cutting edge of the blade operate somewhat as rake-teeth and gather up low-lying vines and weeds—for example, dandelions and like weeds—and raise them up, so as to be cut by the rotary cylinder, or if the stems of the weeds are so short that their heads cannot be raised up so that the cutter-cylinder will contact therewith the short stems of such weeds will pass between the parallel edges of the teeth, and the heads thereof not being able to pass between the teeth will be torn off thereby, while at the same time the lawn-grass passing between the teeth is cut in the usual manner.

This improvement is hereinafter fully set forth and described, and illustrated in the accompanying drawings, in which—

Figure 1:
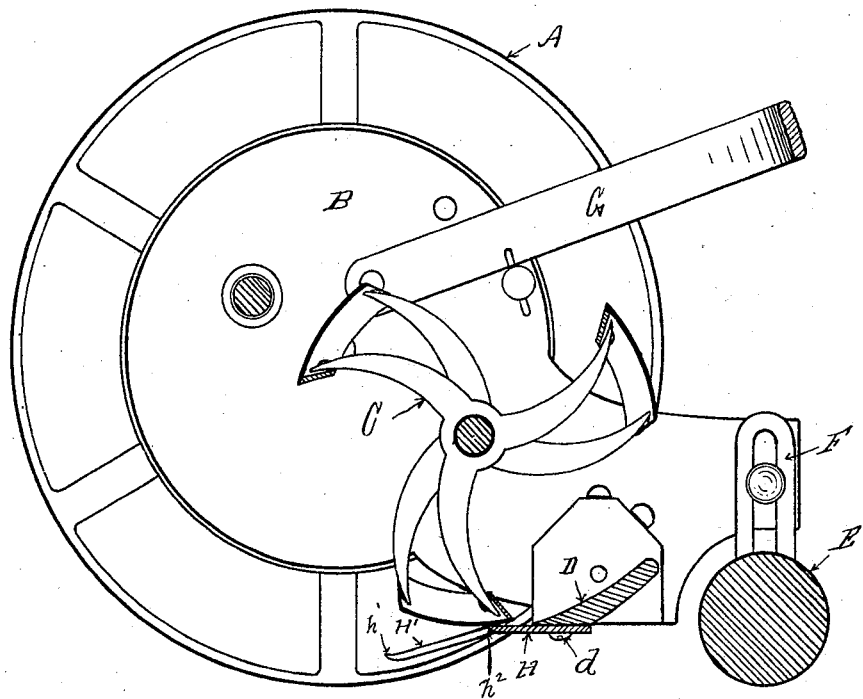
Figure 2:
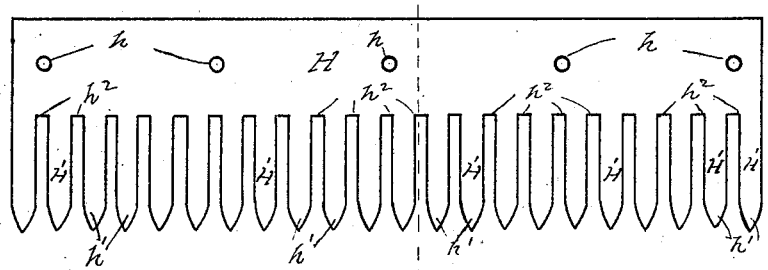

Figure 1 is a transverse section of a lawn-mower embodying my improved stationary cutter-blade. Fig. 2 is a top or plan view of my improved cutter-blade.

In the drawings thus illustrating my invention I have shown a transverse section of a conventional lawn-mower with a rotary cylinder in which the driving-wheels A, the gear-case B, the rotary cylinder C, the stationary cutter-bar D, the guide-roller E and its adjusting mechanism F, and the handle-bars G are of the usual type of construction, and further description thereof is deemed unnecessary.

The stationary cutter-blade H is provided with holes $h$, by means whereof it can be secured to the stationary cutter-bar D by means of screws $d$ in the usual manner, as clearly shown in Fig. 1. This cutter-blade H is formed with teeth H' upon its front edge. The edges of these teeth H' are parallel nearly to the points thereof, where they are rounded to form points thereon. These parallel edges of the teeth H' are provided with sharp corners on their upper surfaces and extend forward therefrom at a downward inclination, so that the points $h'$ thereof, which are slightly curved upward, are considerably below the front edge of the blade H, as clearly illustrated by the cross-section thereof shown in Fig. 1, taken on the line $x\,x$ in Fig. 2, the cutting edge of the blade consisting of the edges $h^2$ of the spaces between the teeth H'. In operation as the lawn-mower is moved forward the teeth H' pass between the upright stalks of lawn-grass and considerably closer to the ground than the cutting edge $h^2$ of the blade H, so that they gather up any low-lying weeds and vines and either tear off their heads and blossoms or raise them up to the edge $h^2$ of the blade, when they, together with the grass passing between the teeth H', are cut off by the rotary cutter-cylinder C in the usual manner.

Having thus described my invention so as to enable others to construct and use the same, what I claim as new, and desire to secure by Letters Patent of the United States, is—

The combination in a lawn-mower of a rotary cylinder, spiral cutter-blades on said cylinder, a stationary cutter-blade, downwardly-inclined teeth having their edges parallel with each other and sharp, rounded points on said teeth which curve slightly upward, and cutting-surfaces on the cutter-blade between said teeth, substantially as and for the purpose set forth.

In testimony whereof I affix my signature in presence of two witnesses.

PATRICK J. TUNNY.

Witnesses:
 J. C. STURGEON,
 HANNA OPPENHEIMER.